Figure 1:
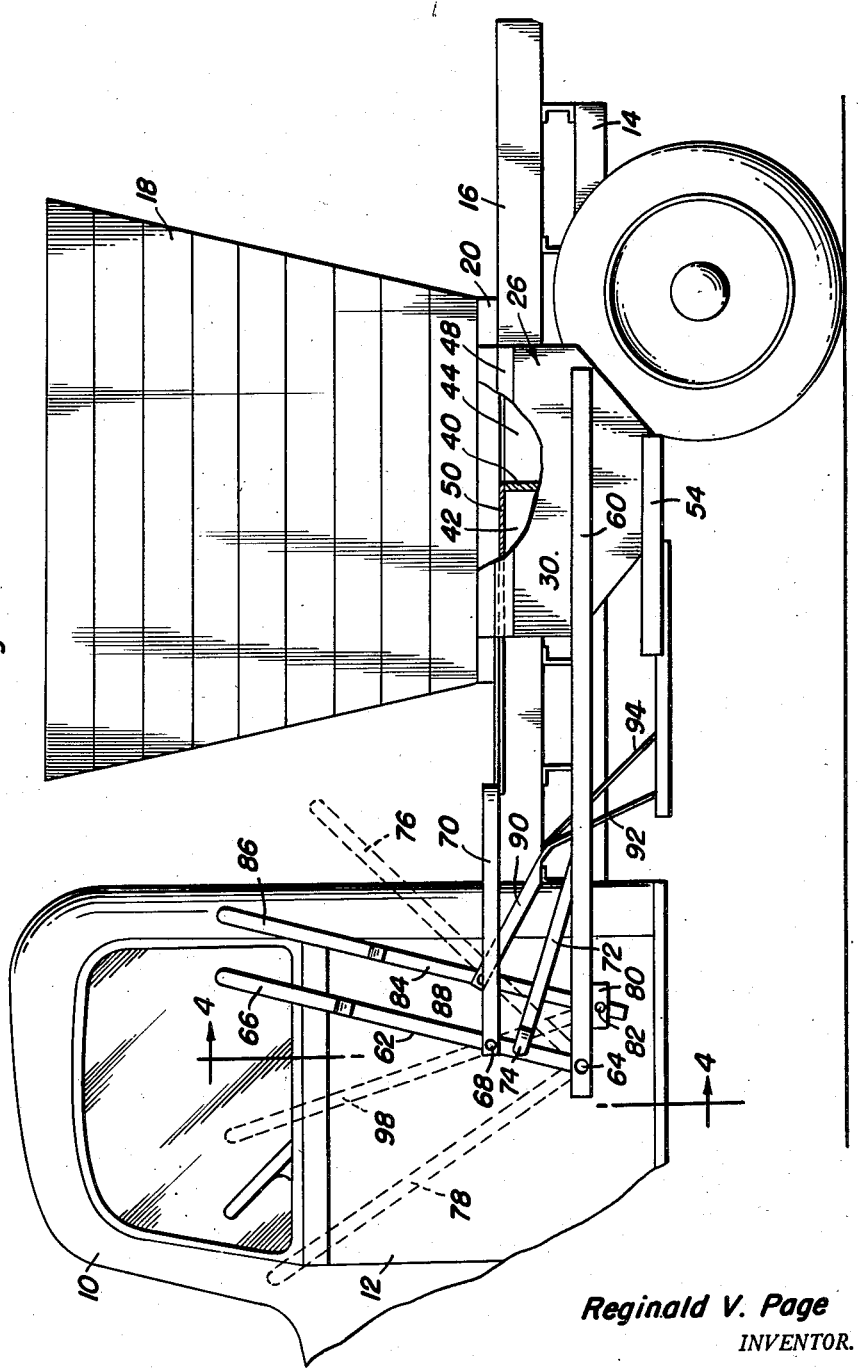

Nov. 11, 1952     R. V. PAGE     2,617,562
POULTRY FEED DISTRIBUTOR

Filed Nov. 28, 1949     2 SHEETS—SHEET 1

Reginald V. Page
INVENTOR.

Nov. 11, 1952 R. V. PAGE 2,617,562
POULTRY FEED DISTRIBUTOR
Filed Nov. 28, 1949 2 SHEETS—SHEET 2
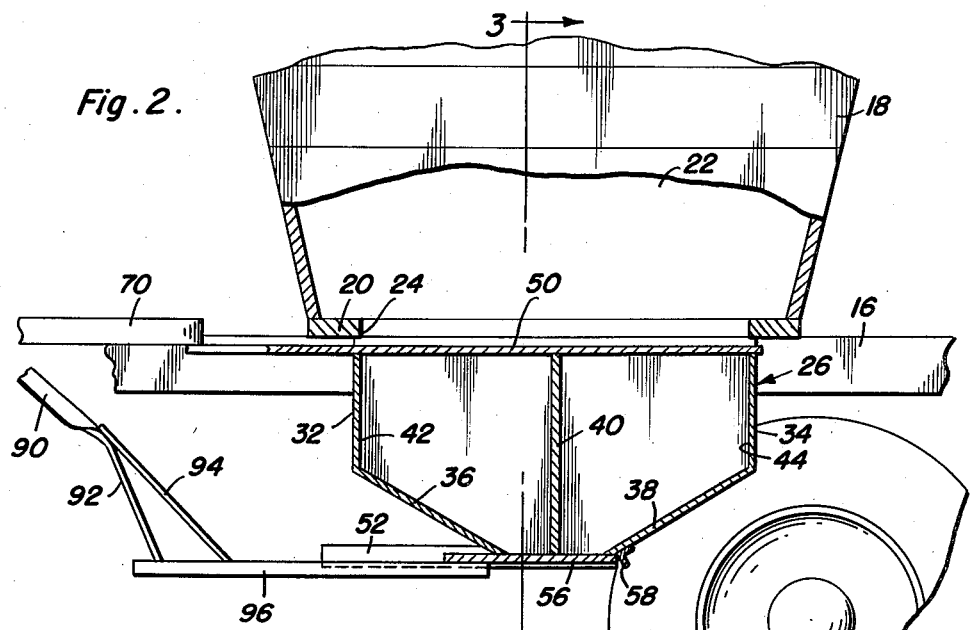
Fig. 2.
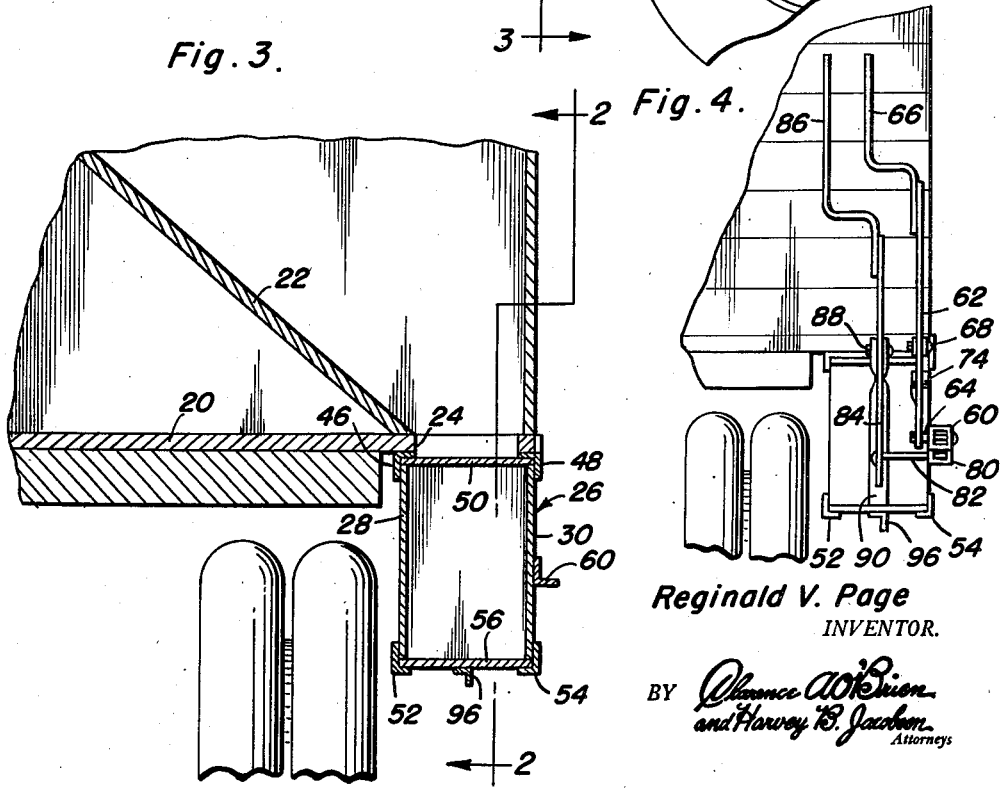
Fig. 3.
Fig. 4.
Reginald V. Page
INVENTOR.
BY *Clarence A. O'Brien*
*and Harvey B. Jacobson*
Attorneys Patented Nov. 11, 1952

2,617,562

UNITED STATES PATENT OFFICE 2,617,562

POULTRY FEED DISTRIBUTOR

Reginald V. Page, Toms River, N. J.

Application November 28, 1949, Serial No. 129,837

4 Claims. (Cl. 222—426)

1

This invention comprises novel and useful improvements in a poultry feed distributor and more specifically pertains to a metering and dispensing device for trucks.

The principal object of this invention is to provide a dispensing device suitable for attachment to motor vehicles and the like for dispensing measured charges of grain or similar material under the control of the driver of the truck and without the necessity for the driver leaving the operator's seat.

A further object of the invention is to provide a dispensing device wherein the entire device is particularly adapted for detachable mounting upon a truck and wherein the controlling devices are conveniently disposed for manipulation by the driver of the truck in a manner which will not interfere with the opening of the truck doors and will not necessitate the driver leaving the cab of the truck.

Yet another important object of the invention is to provide a dispensing device in conformity with the foregoing objects wherein a measuring tank is provided having a plurality of measuring chambers therein, together with a main valve for controlling selectively the filling of the chambers with the material to be dispensed, together with a delivery valve for controlling the discharge ports of the measuring chambers.

An important and additional object of the invention resides in the provision of novel stop means for limiting the movement of the main valve and the delivery valve, together with an arrangement whereby the stop means may be manually overridden as desired.

These, together with various ancillary features and objects of the invention which will later become apparent as the following description proceeds, are attained by the present invention, a preferred embodiment of which has been illustrated by way of example only in the acompanying drawings wherein:

Figure 1 is a fragmentary side elevational view, parts being broken away, showing a preferred embodiment of the invention applied to a truck, alternative positions of the control levers of the valves being shown in dotted lines;

Figure 2 is a vertical longitudinal sectional view taken substantially upon the plane indicated by the broken section line 2—2 of Figure 3, and showing the relative position of the dispensing tank and its measuring chambers with respect to the hopper containing the material to be discharged by the device; and, Figure 3 is a vertical sectional view taken substantially upon the plane indicated by the section line 3—3 of Figure 2 and illustrating in particular the relative positioning of the dispensing tank with respect to the chassis, and the wheels of a motor truck; and, Figure 4 is a vertical transverse sectional view taken substantially upon the plane indicated by the broken section line 4—4 of Figure 1 and illustrating in particular the arrangement of the control levers for the main and delivery valves of the dispensing device.

Referring now more specifically to the accompanying drawings, wherein like numerals designate similar parts throughout the various views, it will be seen that the numeral 10 designates the cab portion of any conventional form of motor truck or similar vehicle, the same being provided with a customary door 12 to permit access by the driver of the vehicle, the truck having a chassis including suitable frame members 14 upon which is mounted a flooring or platform 16 which in accordance with the principles of this invention is provided with a hopper or bin 18 of any desired character for receiving the material such as grain or the like to be dispensed.

As will be more readily apparent from Figures 2 and 3, the tank 18 is provided with a bottom wall 20 which overhangs the side of the truck, the sloping wall 22 is disposed therein for causing the descent of material received within the hopper 18 by gravity towards an opening or port 24 therein. Preferably, although not necessarily, this opening 24 is disposed on the outside of one of the rear wheels of the truck, although it will be readily understood that the discharge port 24 could likewise be located below the center of the body, or in any other convenient location as desired.

In accordance with the present invention, a dispensing tank 26 is mounted to the undersurface of the bottom wall 20 of the hopper 18, and to one side of the wheels of the truck as will be readily apparent from the Figures 3 and 4. Conveniently, this tank may be formed of sheet metal or the like, and includes vertical side walls 28 and 30 which are open at their upper and lower ends, together with front and rear end walls 32 and 34 which at their lower portions are provided with inwardly sloping walls 36 and 38 joined to the edges of the side walls and which terminate in spaced relation from each other to provide a discharge opening for the dispensing tank 26.

A partition plate 40 is disposed between the side walls 28 and 30 intermediate their ends, this partition wall being preferably vertically mounted as shown in Figure 2 for thus dividing the interior of the dispensing tank into a pair of measuring chambers 42 and 44. It will thus be seen that the lower ends of the partition 40 and the walls 36 and 38 define a pair of discharge ports at the bottom of the dispenser tank and from the two measuring chambers therein.

At their upper ends, the side walls 28 and 30 are welded or otherwise rigidly secured to a pair of angle iron members 46 and 48 which in turn are secured to the under surface of the bottom wall 20 of the hopper 18 at opposite sides of the delivery port 24 thereof. The upper ends of the walls 28 and 30 are slightly spaced from the horizontal flanges of the angle iron members 46 and 48, to define a guideway in which is slidably mounted a horizontally disposed plate 50 forming a main or slide valve for controlling the communication between the interior of the hopper 18 and the chambers 42 and 44 of the dispensing tank 26.

It will thus be seen that the main valve 50 may be horizontally slidably adjusted to shut off communication between the hopper 18 and both of the chambers 42 and 44 as shown in Figure 2; may be adjusted as shown in Figure 1 to establish communication with the chamber 44 and close communication of the chamber 42 with the hopper 18; or may be further moved to establish free communication between the hopper 18 and both of the chambers 42 and 44, in a manner which will be readily understood but is not deemed necessary of illustration.

At their lower ends, the side walls 28 and 30 are provided with a pair of angle iron members 52 and 54 which have their vertical flanges welded or otherwise rigidly secured to the exterior surfaces of the side walls, and have their horizontal flanges disposed towards each other and spaced slightly below the lower edges of the side walls to provide a guideway for receiving a horizontally disposed plate 56 which constitutes a delivery slide valve for controlling the discharge openings of the chambers 42 and 44. It will now be apparent that upon sliding movement of the valve plate 56, that the discharge or delivery openings of both of the chambers 42 and 44 may be closed as shown in Figure 2; or that the delivery opening of the chamber 44 may be opened while that of chamber 42 is closed, or finally both of the delivery openings can be opened depending upon the positioning of the slide valve.

A transversely disposed angle iron member 58, see Figure 2, is secured to the inclined wall portion 38 of the rear wall 34 and depends therefrom to provide a transversely disposed abutment or stop means for engagement by the outer extremity of the delivery valve 56, to limit the valve closing movement of the same.

It should be here noted that the dispensing tank 26 is entirely mounted upon and attached to and carried by the hopper 18 and/or its bottom wall 20, the truck platform 16 or the truck chassis frame member 14. Secured to and carried by the outer side wall 30 of the dispensing tank, is a longitudinal supporting beam 60 of angle iron and/or box girder construction, this beam 60 constituting a support upon which is mounted the control mechanism for the main slide valve 50 and the delivery slide valve 56. At its forward end, this support beam 60 is spaced laterally from the cab 10 and the door 12 of the truck, and is so positioned as to permit the operator to obtain access to the cab through the door 12. Further, the device is so arranged that the control means for the valves are disposed in proximity to the window of the cab door 12 while the same may be actuated by the driver without the necessity for the latter to leave the cab in inclement weather or the like.

The main slide valve 50 is actuated by a lever 62 whose lower extremity is pivoted as at 64 to the forward end of the support member 60, the upper end of this lever conveniently having an offset handle portion 66 to facilitate the convenient actuation of the lever by the driver. Intermediate its ends, this lever is pivotally connected as at 68 to a connecting link 70 whose other end is swivelly or pivotally attached in any desired manner to the extremity of the main valve 50, whereby oscillation of the lever will serve to actuate the main valve.

A stop means in the form of a forwardly extending brace 72 is welded or otherwise rigidly attached to the support beam 60, and at its forward end is provided with a laterally projecting portion 74 forming a stop which, as will be apparent from Figures 1 and 4, is positioned to limit clockwise movement of the lever 62 to the position shown in Figure 1, in which position the slide valve 50 closes the chamber 42 but opens communication of the hopper 18 with the chamber 44. However, the lever 62 is of a flexible nature so that the same may be flexed laterally by the operator grasping the handle 66, to cause the lever to pass the stop 74 so that the lever may be moved to the dotted line position shown in Figure 1 at 76, and thus permit the slide valve to close both of the chambers 42 and 44 from the interior of the hopper 18 as shown in Figure 2. Alternatively, the lever 62 can be moved to the dotted line position shown at 78 thus causing the slide valve to open both of the measuring chambers to the hopper.

The manual control means for selectively operating the slide delivery valve is provided. A journal 80 is secured in any desired manner to the under surface of the support beam 60, and has a laterally extending axle or pivot pin 82, as shown in Figure 4. Journalled on this pin 82 is a lower extremity of a manual control lever 84 having an offset handle portion 86 at its upper end. Pivoted to the lever 84 as at 88, is a connecting rod 90 which is connected at its lower extremity by a pair of brace rods 92 and 94, to an angle iron member 96 forming a tongue or handle secured to the under surface of the plate delivery slide valve 56. The arrangement is such that in its full line position, shown in Figure 1, the lever 84 will cause the delivery slide valve 56 to be in a position against the stop 58 and in its closed position, as shown in Figure 2, thus closing the delivery ports of the measuring chambers. However, the lever 84 may be selectively moved to the dotted line position 98 to cause the delivery slide valve to uncover the delivery port of the chamber 44, and may then be further moved to cause the delivery slide valve 56 to uncover both of the delivery ports of the two measuring chambers in a manner not shown but which will be readily understood.

From the foregoing it will now be seen that when the hopper 18 is filled with a suitable material to be dispensed such as poultry feed, feed for range stock or any other material which it is desired to dispense periodically, the operator by a selective actuation of the two manual control levers may selectively fill either or both of the measuring chambers; and may selectively discharge one or both of the same. Obviously, by properly designing the capacity of the measuring chambers, any desired quantity of material may be dispensed at a desired location.

It should be further noted that the entire operation may be performed by a single person without the necessity for this person leaving the cab, thus greatly facilitating the depositing of predetermined quantities of material at specified locations, greatly saving the time of the operator, conserving the operator's strength.

Further, it will be noted that the device is particularly characterized by its inexpensive construction, the ease and rapidity with which the same may be constructed, installed or removed from a truck, the complete lack of interference by the device with the opening of the truck door. Further, it will be seen that the device may be readily applied to any conventional truck and any size of hopper or reservoir mounted upon the truck, will enable the discharge of measured and exact quantities of material in adjustable amounts either successively by manipulating the control levers for each discharge, or continuously by maintaining the main and delivery valves partly open during travel of the truck.

From the foregoing, the construction together with the advantages of the device will be readily apparent and further explanation is believed to be unnecessary. However, since numerous modifications will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A dispensing device for trucks having a hopper comprising a dispensing tank communicating with and disposed beneath said hopper, a partition in said tank dividing the same into measuring chambers, a main slide valve controlling communication between said hopper and said tank, discharge ports on the bottom of said tank for each of said chambers, a delivery slide valve, a mounting for the delivery slide valve located at the outside of one of the chambers, said delivery slide valve movable in said mounting transversely of the partition across the port of one of said chambers and then movable across the port of the remaining of said chambers so as to control the delivery from said chambers seriatim independently of said main slide valve, a separate control means for each of said valves, said control means being remote from said tank.

2. A dispensing device for trucks having a hopper comprising a dispensing tank communicating with and disposed beneath said hopper, a partition in said tank dividing the same into measuring chambers, a main slide valve controlling communication between said hopper and said tank, discharge ports on the bottom of said tank for each of said chambers, a delivery slide valve, a mounting for the delivery slide valve located at the outside of one of the chambers, said delivery slide valve movable in said mounting transversely of the partition across the port of one of said chambers and then movable across the port of the remaining of said chambers so as to control the delivery from said chambers seriatim independently of said main slide valve, a separate control means for each of said valves, said control means being remote from said tank, said control means including an arm attached to the outside of said tank, said arm extending longitudinally of said tank and having an end terminating remote from said tank, separate actuating levers for said main and delivery slide valves pivoted to said arm adjacent its remote end and means connecting each of said levers to its associated slide valve.

3. The combination of claim 2, wherein said arm is attached to said tank intermediate said main and delivery slide valves.

4. The combination of claim 2, wherein said last-mentioned means includes extensions on each of said slide valves, said extensions being pivotally connected to their respective actuating levers remote from the pivotal connection of said levers with said arm.

REGINALD V. PAGE.

REFERENCES CITED

The following references are of record in the file of this patent:

UNITED STATES PATENTS

| Number | Name | Date |
| --- | --- | --- |
| 386,695 | Ehlers | July 24, 1888 |
| 531,237 | Walsh | Dec. 18, 1894 |
| 943,854 | Whitten et al. | Dec. 21, 1909 |
| 1,027,177 | Case et al. | May 21, 1912 |
| 1,139,269 | Goodman et al. | May 11, 1915 |
| 1,313,491 | Lazzell | Aug. 19, 1919 |